(12) United States Patent
Jadrić

(10) Patent No.: US 6,462,974 B1
(45) Date of Patent: Oct. 8, 2002

(54) SPACE VECTOR MODULATION-BASED CONTROL METHOD AND APPARATUS FOR THREE-PHASE PULSE WIDTH MODULATED AC VOLTAGE REGULATORS

(75) Inventor: Ivan Jadrić, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/963,642

(22) Filed: Sep. 27, 2001

(51) Int. Cl.$^7$ .................. H02M 7/217; H02M 7/5387
(52) U.S. Cl. .................. 363/127; 363/132; 363/137
(58) Field of Search .................. 363/127, 129, 363/132, 137, 125

(56) References Cited

U.S. PATENT DOCUMENTS

| | | |
|---|---|---|
| 3,670,234 A | 6/1972 | Joyce |
| 4,030,015 A | 6/1977 | Herko et al. |
| 4,580,089 A | 4/1986 | Grunsch et al. |
| 5,502,630 A | 3/1996 | Rokhvarg |
| 5,519,311 A | 5/1996 | Widmayer |
| 5,574,636 A * | 11/1996 | Lee et al. .................. 363/132 |
| 5,691,628 A | 11/1997 | Martin |
| 5,852,558 A * | 12/1998 | Julian et al. .................. 363/132 |
| 5,886,891 A | 3/1999 | Jiang et al. |
| 5,889,667 A | 3/1999 | Bernet |
| 5,910,892 A * | 6/1999 | Lyons et al. .................. 363/98 |
| 5,923,143 A | 7/1999 | Cosan et al. |
| 5,949,664 A * | 9/1999 | Bernet et al. .................. 363/37 |
| 5,949,672 A * | 9/1999 | Bernet .................. 363/159 |
| 5,982,161 A | 11/1999 | Nguyen et al. |
| 6,005,783 A * | 12/1999 | Xue et al. .................. 363/36 |
| 6,020,726 A | 2/2000 | James |
| 6,025,701 A | 2/2000 | Weinhold |
| 6,337,801 B2 * | 1/2002 | Li et al. .................. 363/127 |
| 6,337,804 B1 * | 1/2002 | Kea et al. .................. 363/132 |

OTHER PUBLICATIONS

S. A. K. Bhat; "Digitally Controlled Multiple–Pulse–Width––Modulated AC Chopper for Power Control"; Int. J. Electronics, vol. 51, No. 1; 1981; pp. 45–56.

D. Borojevic; "Space Vector Modulation in Matrix Converters"; VPEC Publication Series, vol. V; 1994; pp. 287–297.

D.G. Holmes; "The Significance of Zero Space Vector for Carrier Based PWM Schemes"; Proceedings IEEE IAS 1995 Annual Meeting; 1995; pp. 2451–2458.

A. Mozdzer, B.K. Bose; "Three Phase AC Power Control Using Power Transistors"; IEEE Transactions on Industry Transactions, vol. 1A–12, No. 5; Sep./Oct. 1976; pp. 499–505.

N. Burany; "Safe Control of Four Quadrant Switches"; Proceedings IEEE IAS 1989 Annual Meeting; 1989; pp. 1190–1194.

* cited by examiner

*Primary Examiner*—Bao Q. Vu
(74) *Attorney, Agent, or Firm*—McNees Wallace & Nurick LLC; Brian T. Sattizahn; Carmen Santa Maria

(57) ABSTRACT

A system and method are provided for controlling a three-phase pulse-width-modulated alternating-current voltage regulator, in order to reduce inrush current when starting, for example, a large three-phase induction motor. The system and method include a set of four-quadrant switches connected in a converter circuit between the input voltage and the output load. By applying certain switching states in a determined sequence based on sensed values of the input voltage at the three lines, the system and method synthesize a three-phase variable magnitude output voltage from the three-phase input voltage of fixed magnitude.

24 Claims, 5 Drawing Sheets

| # | Switch number | | | | | | Input Current | | | Output Voltage | | |
|---|---|---|---|---|---|---|---|---|---|---|---|---|
| | 1 | 2 | 3 | 4 | 5 | 6 | $i_a$ | $i_b$ | $i_c$ | $V_{AB}$ | $V_{BC}$ | $V_{CA}$ |
| 1 | 0 | 0 | 0 | 0 | 1 | 1 | 0 | 0 | 0 | 0 | 0 | 0 |
| 2 | 0 | 0 | 0 | 1 | 0 | 1 | 0 | 0 | 0 | 0 | 0 | 0 |
| 3 | 0 | 0 | 0 | 1 | 1 | 0 | 0 | 0 | 0 | 0 | 0 | 0 |
| 4 | 0 | 0 | 0 | 1 | 1 | 1 | 0 | 0 | 0 | 0 | 0 | 0 |
| 5 | 0 | 0 | 1 | 0 | 1 | 1 | 0 | 0 | 0 | 0 | 0 | 0 |
| 6 | 0 | 0 | 1 | 1 | 0 | 1 | 0 | 0 | 0 | 0 | 0 | 0 |
| 7 | 0 | 0 | 1 | 1 | 1 | 0 | 0 | 0 | 0 | 0 | 0 | 0 |
| 8 | 0 | 0 | 1 | 1 | 1 | 1 | 0 | 0 | 0 | 0 | 0 | 0 |
| 9 | 0 | 1 | 0 | 0 | 1 | 1 | 0 | 0 | 0 | 0 | 0 | 0 |
| 10 | 0 | 1 | 0 | 1 | 0 | 1 | 0 | 0 | 0 | 0 | 0 | 0 |
| 11 | 0 | 1 | 0 | 1 | 1 | 0 | 0 | 0 | 0 | 0 | 0 | 0 |
| 12 | 0 | 1 | 0 | 1 | 1 | 1 | 0 | 0 | 0 | 0 | 0 | 0 |
| 13 | 0 | 1 | 1 | 0 | 0 | 1 | 0 | $i_B$ | $i_A+i_C$ | $-V_{bc}$ | $V_{bc}$ | 0 |
| 14 | 0 | 1 | 1 | 1 | 0 | 0 | 0 | $i_A+i_B$ | $i_C$ | 0 | $V_{bc}$ | $-V_{bc}$ |
| 15 | 1 | 0 | 0 | 0 | 1 | 1 | 0 | 0 | 0 | 0 | 0 | 0 |
| 16 | 1 | 0 | 0 | 1 | 0 | 1 | 0 | 0 | 0 | 0 | 0 | 0 |
| 17 | 1 | 0 | 0 | 1 | 1 | 0 | 0 | 0 | 0 | 0 | 0 | 0 |
| 18 | 1 | 0 | 0 | 1 | 1 | 1 | 0 | 0 | 0 | 0 | 0 | 0 |
| 19 | 1 | 0 | 1 | 0 | 1 | 0 | $i_A$ | 0 | $i_B+i_C$ | $-V_{ca}$ | 0 | $V_{ca}$ |
| 20 | 1 | 0 | 1 | 1 | 0 | 0 | $i_A+i_B$ | 0 | $i_C$ | 0 | $-V_{ca}$ | $V_{ca}$ |
| 21 | 1 | 1 | 0 | 0 | 0 | 1 | $i_A+i_C$ | $i_B$ | 0 | $V_{ab}$ | $-V_{ab}$ | 0 |
| 22 | 1 | 1 | 0 | 0 | 1 | 0 | $i_A$ | $i_B+i_C$ | 0 | $V_{ab}$ | 0 | $-V_{ab}$ |
| 23 | 1 | 1 | 1 | 0 | 0 | 0 | $i_A$ | $i_B$ | $i_C$ | $V_{ab}$ | $V_{bc}$ | $V_{ca}$ |

FIG. 3

SPACE VECTOR MODULATION-BASED CONTROL METHOD AND APPARATUS FOR THREE-PHASE PULSE WIDTH MODULATED AC VOLTAGE REGULATORS

BACKGROUND OF THE INVENTION

This invention generally relates to control systems and methods for three-phase pulse-width-modulated alternating-current voltage regulators (also referred to as AC choppers). More particularly, the present invention relates to a space vector modulation control system and method used with a three-phase pulse-width-modulated alternating-current voltage regulator.

A number of applications, such as air conditioning or refrigeration applications, utilize multi-phase induction motors. The starting, or inrush, current for multi-phase motors tends to be several times the rated full-load current. This high inrush current may have many detrimental effects on the equipment and the power system in general, as well as the economics of power usage. By means of example only, drawing high inrush current over a long power line may cause the voltage to essentially collapse, leaving insufficient voltage for equipment to operate with. Furthermore, with high motor inrush current, other customers along the same power line may experience undesirable voltage fluctuations during the start of the motor. To discourage this situation, power companies sometimes impose penalties if a customer's starting or inrush currents are excessive. This is particularly true in the regions with "weak" power grid, e.g. in Europe. Thus, it is desirable to minimize the current drawn by a multi-phase induction motor during starting.

Several known methods exist, which allow for the reduction of induction motors' inrush current. Use of an autotransformer is one known methodology for achieving lower motor starting currents. Autotransformers, however, are relatively inflexible, in that the turns ratio of an autotransformer is established up front and remains fixed by the design of the components. Another approach employs the use of series elements such as inductors, resistors, and the like, to limit starting current. The latter approach, however, requires significantly higher line currents than autotransformer starters to provide the same amount of torque in the motor. Yet another approach consists in employing the so-called wye-delta motor starters. This type of equipment configures the connection of induction motor winding in a different manner during the motor start-up than during the regular motor operation. This allows the motor to start with a reduced inrush current.

The above methods for achieving reduced motor inrush currents can all be characterized as electro-mechanical methods. They require a set of electro-mechanical contactors in order to alter the connection of an induction motor to the power line. This altering of connection further results in a reduced voltage being applied to each of the motor's windings, which in turn results in reduced inrush currents. Electro-mechanical contactors have the disadvantage of being expensive and prone to reliability problems due to wear and tear. In addition, their transitions can cause voltage or current spikes with potentially damaging effects to the system.

The problems associated with electromechanical starting methods for induction motors can be avoided by employing electronic (or solid-state) starting methods. Electronics motor starters reduce the voltage supplied to an induction motor during its startup by means of a power electronics converter. One such converter technology employs thyristors, also called silicon-controlled rectifiers (SCRs). SCRs are semiconductor switches that can be turned on by means of an electronic signal. However, they cannot be forcefully turned off, i.e. they can be turned off only if the current through them naturally extinguishes itself. In a typical SCR-based motor starter, two SCRs are back-to-back connected between each of the motor's phases and the power line. During the motor start-up, the SCRs are turned on only once in every line cycle, and this is done in a delayed fashion, so that the motor is actually connected to the power line for only a portion of each line period. This results in a reduced voltage being applied to the motor, and therefore a reduced inrush current being drawn from the power line. The amplitude of the fundamental voltage being supplied to the motor is controlled by the time instant when an SCR is turned on within a line cycle. This type of control is usually referred to as phase control.

With no electromechanical contactors needed, SCR-based solid-state motor starters represent an improvement over electromechanical starters in terms of reliability and cost. However, SCR-based electronic starters have the disadvantage of distorting motor's current and voltage waveforms during the start-up. In addition, they offer no possibility for improving the power factor (power factor is intended as the phase displacement between the fundamental component of voltage and current at the line terminals feeding the motor starter). A good power factor is generally a desired feature in any electrical system.

Alternatively, pulse-width-modulating (PWM) alternating-current (AC) voltage regulators can be used for starting large induction motors, as they allow for a significant reduction in inrush current and provide better quality motor current and voltage waveforms during start-up than SCR-based motor starters. Similarly to SCR-based technology, a PWM AC voltage regulator includes a power electronics converter capable of supplying an output voltage of a fixed frequency, but at a variable magnitude, to AC loads. PWM AC voltage regulators differ from phase-controlled SCR-based AC voltage regulators in that, with PWM AC voltage regulators, the switching of power semiconductors occurs at a frequency many times higher than the input line frequency (usually equal to 50 or 60 Hz). Such high rate of semiconductor switching can be achieved with modern power semiconductors with full turn-on and turn-off capability, such as, for example, insulated gate bipolar transistors (IGBTs). The control of the fundamental amplitude of the output voltage of a PWM AC voltage regulator is achieved through the control of the width of the pulses of which the output voltage waveform in such a regulator consists. A single-phase PWM AC voltage regulator circuit is described in U.S. Pat. No. 5,923,143 to Cosan et al. entitled "Solid State Motor Starter with Energy Recovery."

PWM AC voltage regulators, when used for starting of induction motors, have several advantages compared to SCR-based motor starters. First, they are able to start a motor with a smaller fundamental component of line inrush current. Typically, if an SCR-based motor starter requires an inrush current equal to 45% of motor's locked-rotor current (LRA), a PWM AC voltage regulator used with the same motor shall require around 20% of LRA. Second, PWM AC voltage regulators generate better-quality motor current and voltage waveforms during the start-up. This results in lower pulsating torque produced by the motor, which, in turn, benefits the motor's mechanical driveline. Finally, PWM AC voltage regulators offer the possibility for power factor correction.

Practical implementation of three-phase voltage regulators requires semiconductor switches that can conduct, or block, electric current flow in either direction in a fully controllable manner (also referred to as four-quadrant switches). No such single semiconductor device exists nowadays. Therefore, four-quadrant switches are implemented as a combination of at least two two-quadrant switches (i.e. switches that can fully control the current flow in one direction only). Examples of two-quadrant semiconductor switches are bipolar junction transistors (BJTs), gate turn-off thyristors (GTOs, insulated gate bipolar transistors (IGBTs), etc.

Control of a three-phase PWM AC voltage regulator may be accomplished in different ways. Two possible methods are described in A. Mozdzer and B. K. Bose, "Three-Phase AC Power Control Using Power Transistors," IEEE Transactions on Industry Applications, Vol. 1A–12, No. 5, September/October 1976, pp. 499–505 and in S. A. K. Bhat, "Digitally-controlled multiple-pulse-width-modulated AC chopper for power control," International Journal of Electronics, Vol. 51, No. 1, 1981, pp. 45–56. Both control methods are developed for four-quadrant switches implemented with BJTs. They are both dependent on the load power factor, which makes them unsuitable for starting of induction motors (during the start-up, the power factor of a typical induction motor changes form a low value to a high value). Under certain operating conditions, the described methods result in distorted output voltage and current waveforms. In addition, they do not address the issue of PWM AC voltage regulator losses and power factor.

It is desirable, therefore, to provide an improved method and system for control of a three-phase PWM AC voltage regulator. It is further desirable to achieve a variable output voltage with better harmonic content and with lower switching losses. Additionally, it is desirable to improve the power factor by permitting the output voltage to be shifted in phase with respect to the input voltage.

SUMMARY OF THE INVENTION

The present invention represents improvements over the known methods and provides a system and method for controlling a PWM AC voltage regulator that is not dependent upon the load power factor and does not result in distortion of output current and voltage waveforms. Rather, by using space vector modulation, it is possible to control a PWM AC voltage regulator to obtain a variable output voltage with better harmonic content and lower switching losses. Further, this method and system permit the output voltage to be shifted in phase with respect to the input voltage thereby improving the power factor.

Additional objects and advantages of the invention will be set forth in part in the description which follows, and in part will be appreciated by one of ordinary skill from the description, or may be learned by practice of the invention. The objects and advantages of the invention will be realized and attained by means of the elements and combinations particularly pointed out in this application and the appended claims.

To attain the advantages and in accordance with the purposes of the invention, as embodied and broadly described herein, there is provided a pulse-width-modulated alternating-current voltage regulator system to provide a regulated AC voltage from a three-phase voltage source to a three-phase load, such as, for example, a three-phase induction motor as used in air conditioning and refrigeration applications. Between the three-phase voltage source and the three-phase load, the system includes six four-quadrant switches. The first switch is connected between one terminal of the voltage source and one terminal of the load. The second switch is connected between a second terminal of the voltage source and a second terminal of the load. The third switch is connected between a third terminal of the voltage source and a third terminal of the load. The fourth, fifth, and sixth switches are shunt switches between the first, second, and third switches. More particularly, one end of the fourth switch is connected to the junction between the first switch and the first terminal of the load. The other end of the fourth switch is connected to the junction between the second switch and the second terminal of the load. One end of the fifth switch is connected to the junction between the second switch and the second terminal of the load; the other end of the fifth switch is connected to the junction between the third switch and the third terminal of the load. Finally, one end of the sixth switch is connected to the junction between the third switch and the third terminal of the load. The other end of the sixth switch is connected to the junction between the first switch and the first terminal of the load.

The system further includes sensors connected to each phase of the three-phase voltage source to sense the voltage of each phase at any given time. The system also includes a processor for receiving information from these sensors about the input line voltage and for driving the switches based on the received information, as well as predetermined values and software placed in the memory of the processor.

Further, there is provided a method for controlling a three-phase pulse-width-modulated alternating current voltage regulator in a system including six four-quadrant switches. Input and output three-phase voltages are represented by means of space vectors in a two-dimensional voltage plane. The input space vector, representative of the three-phase input line voltages, has a constant magnitude (typically equal to the peak value of the line voltage sinusoid) and rotates around the origin of the voltage plane with a speed equal to the line frequency. A reference output space vector is created based on the desired magnitude and phase of fundamental output voltage. Typically, during the motor start-up, the reference output space vector is smaller in magnitude than the input space vector so that a reduced voltage is provided to the motor. If no power factor correction is desired, the reference output space vector is in phase with the input space vector. Otherwise, there may be a phase displacement between the two. A set of active switching states and a set of zero switching states based on the state of the six four-quadrant switches is provided. Each active switching state is associated with two of six possible output space vectors, representative of the three-phase output voltage of a PWM AC voltage regulator. Each zero switching state is represented by a point in the origin of the voltage plane. The six output space vectors delineate the voltage plane into six sectors. The sensing of input voltages makes it possible to determine the position of the input space vector in the voltage plane. Next, based on the desired phase displacement (with respect to the input space vector) of the reference output space vector, the sector in which the reference output space vector lays at a given time is identified. The two output space vectors bordering the identified sector are then chosen from the set of six possible output space vectors. The active switching states corresponding to the chosen output space vectors are identified next. An appropriate zero switching state is then selected from the provided zero switching states . Finally, by sequencing through the two identified active switching states and the identified appropriate zero switching state at a frequency (referred to as the converter's switching frequency) many times greater than the line frequency, the desired fundamental output voltage is obtained. As the position of the reference output space vector changes from one sector to another, different (active and zero) switching states are applied to provide the desired output voltage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings:

FIG. 3 is a table illustrating allowed switching states for a three-phase PWM AC voltage regulator, such as that of FIG. 1;

DETAILED DESCRIPTION

Figure 1:
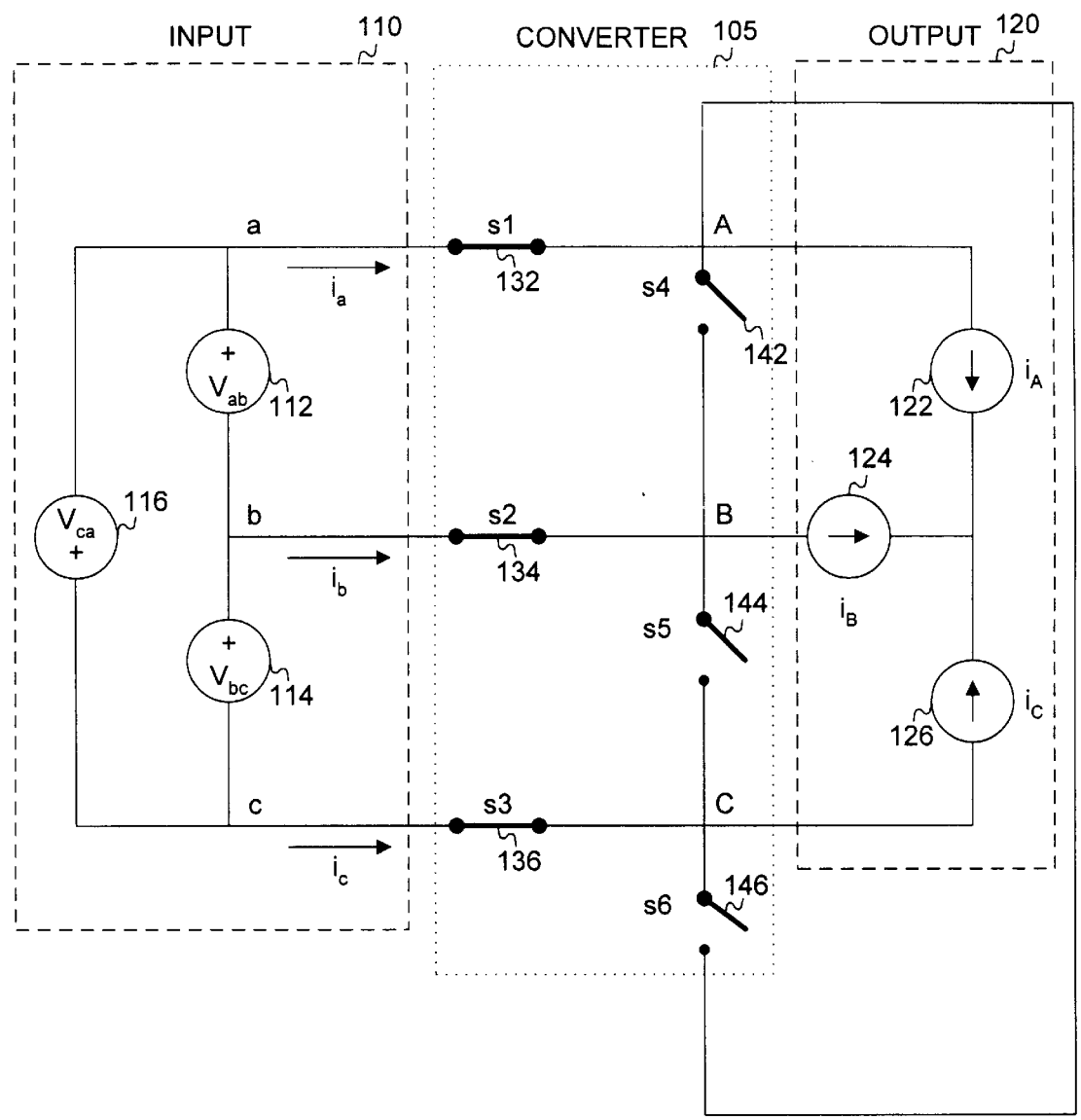
FIG. 1 is a schematic diagram of an exemplary three-phase PWM AC voltage regulator.

Reference will now be made in detail to the presently preferred embodiment of the present invention, an example of which is illustrated in the accompanying drawings. Wherever possible, the same or similar reference numbers will be used throughout the drawings to refer to the same or like parts. An exemplary embodiment of a system of the present invention is shown in FIG. 1 and is designated generally by reference numeral 100.

In accordance with the present invention, there is provided a space vector modulation control method and system for a three-phase PWM AC voltage regulator. The system includes an input, an output load, and six four-quadrant semiconductor switches. By applying certain switching states in a determined sequence, the system synthesizes a three-phase variable magnitude output voltage from the three-phase input voltage of a fixed magnitude. The synthesized output voltage can be supplied to any three-phase AC load, such as, for example, a three-phase induction motor used in the heating, ventilation, and air conditioning (HVAC) industry, where reduced line inrush current during motor startup is desired.

By way of a non-limiting example, FIG. 1 illustrates an exemplary three-phase PWM AC voltage regulator 100. The voltage regulator 100 may include an input circuit 110, an output circuit 120, and a converter circuit 105. Input circuit 110 may be represented as an ideal three-phase voltage source (shown by voltage sources 112, 114, and 116). Output circuit 120, for the sake of simplicity, may be represented by an ideal three-phase current source (illustrated by current sources 122, 124, and 126). In a practical implementation, however, the input could include any commercially available source of three phase power, and the output circuit 120 could include any three-phase load, such as, for example, a three-phase induction motor used in air conditioning or refrigeration applications. The converter circuit 105 of the voltage regulator 100 consists of six bi-directional, or four-quadrant, switches 132, 134, 136, 142, 144, and 146, labeled s1 through s6. These switches 132–146 are capable of conducting or blocking electric current of either polarity. Practical four-quadrant switches may be implemented with pairs of two-quadrant switches, such as IGBTs, which are commercially available. One such practical implementation of the four-quadrant switches 132–146 of converter circuit 105 of the voltage regulator 100 is described in U.S. patent application Ser. No. 09/963,695, filed Sep. 27, 2001 entitled "Control System and Method for Four-Quadrant Switches in Three-Phase PWM AC Voltage Regulators" to Jadrić, which is herein incorporated by reference.

Voltage regulator 100, as shown in FIG. 1, has switches s1 132, s2 134, and s3 136 closed and s4 142, s5 144, and s6 146 open. This particular switching state, or combination of switches s1 through s6 132–146 being open or closed, is only one among many allowed switching states. In particular, any switching state that does not short-circuit the input voltages 112–116 and does not open-circuit the load currents 122–126, is an allowed switching state. The control of the converter circuit 105, aimed at synthesizing a voltage of desired magnitude at the load terminals A, B and C, can be implemented by sequencing the allowed switching states of the converter circuit 105. The switches can be controlled by a variety of controls. Preferably, the switches are controlled by gate driver circuits that, in turn, are controlled by a microprocessor or similar computing device that opens and closes the switches according to sensed information, along with data and/or algorithms placed in a memory.

Figure 2:
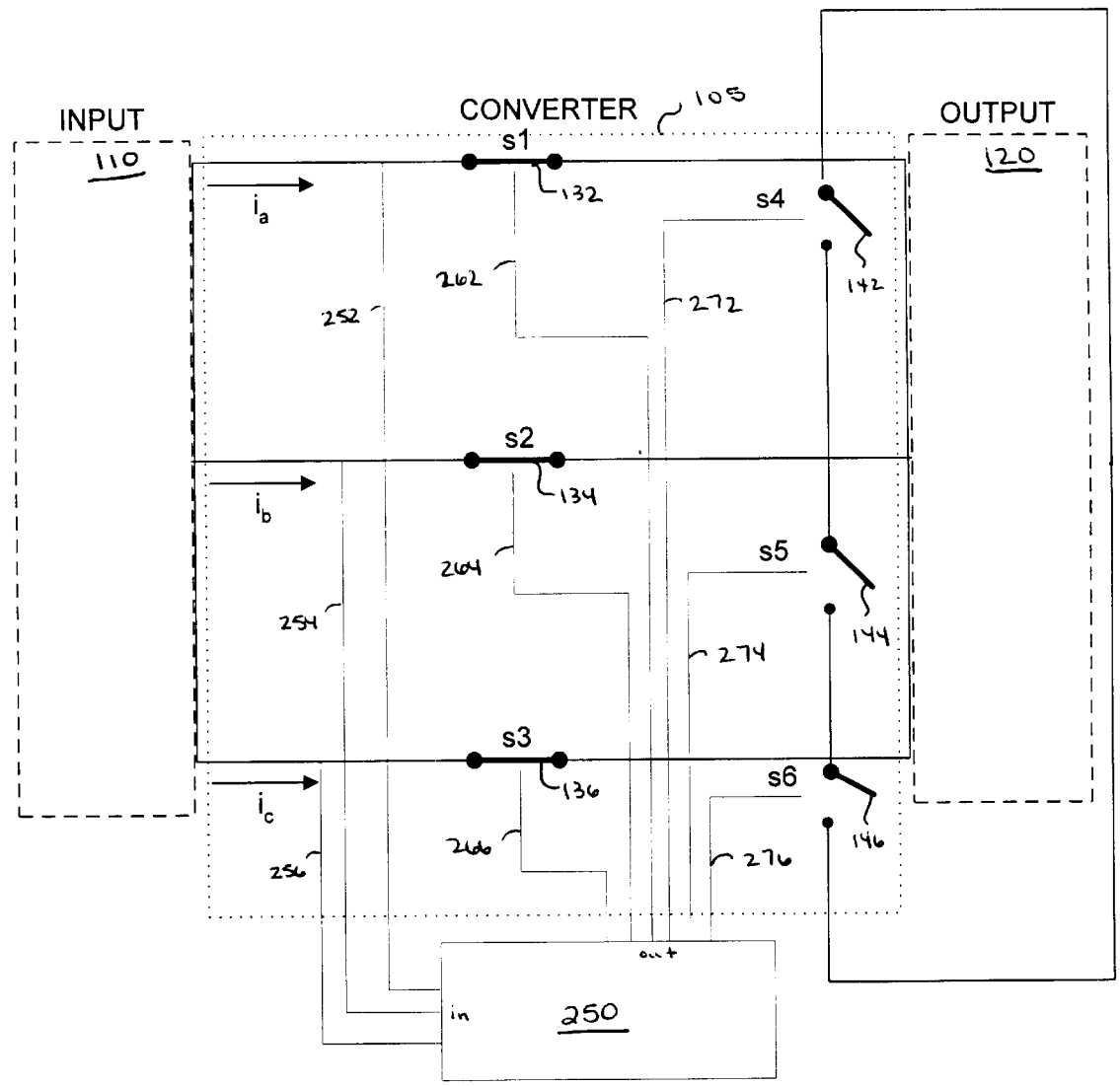
FIG. 2 is another schematic diagram of an exemplary three-phase PWM AC voltage regulator, consistent with the present invention.

An example of a voltage regulator 200 including a processor 250 for sequencing the switches is shown in FIG. 2. Voltage regulator 200 includes a converter circuit 105, an input circuit 110 and an output circuit 120. As discussed with reference to FIG. 1, input circuit 110 is a three-phase voltage source. Output circuit 120 is a three-phase load, such as a three-phase induction motor. Converter circuit 105 further includes switches s1 132, s2 134, s3 136, s4 142, s5 144, and s6 146. Switches s1 through s6 132–146 are four-quadrant switches, and each switch may be implemented using two two-quadrant switches, such as IGBTs.

Processor 250 is connected to sensors that sense the input line voltage to the converter circuit 105. Based on that sensed information, the desired value of the output voltage, and the application of an algorithm or program of the type described below, the processor drives switches s1–s6 132–146. Processor 250 can be a microprocessor, a computer, an integrated chip, or any other digital or analog control that is programmed or designed to practice the inventive steps disclosed and claimed herein.

Input lines 252, 254, and 256, respectively, connect to a sensor at each of the phases of the input voltage from input circuit 110 and provide input line voltage information to processor 250. Processor 250 receives this input line voltage information, combines or compares it with preselected criteria, and makes a determination about which of switches s1–s6 132–146 should be open or closed, or which of the allowed switching states should be implemented. Processor 250 then drives switches s1–s6 132–146 by sending signals to the switches through the gate driver circuits using output lines 262–276, respectively.

FIG. 3 summarizes the allowed switching states for the control system and methods of the present invention. Each row represents an allowed switching state. As shown, for the system with six switches, there are 23 allowed states, state 23 representing a direct connection of the input voltage to the output load, such as a motor. The first column in the table assigns a number to each state, or row, for identification. The following six columns define each switching state by indicating whether each of the converter's six switches s1 through s6, 132–146, respectively, is open (denoted by 0) or closed (denoted by 1) in that particular state. The last six columns define, for each switching state, what the input currents ($i_a$, $i_b$, and $i_c$) and output voltages ($v_{AB}$, $v_{BC}$, and $V_{CA}$) are equal to, in terms of output currents ($i_A$, $i_B$, and $i_C$) and input voltages ($v_{ab}$, $v_{bc}$, and $v_{ca}$), respectively. Most states cause the converter input current and output voltages to be equal to zero. For example, see states 1–12 and 15–18. These states are called zero switching states. States 13, 14, 19, 20, 21, and 22 (represented as shaded in FIG. 3) are of a particular interest for the control of the converter circuit 105. These states are called active states. State 23 corresponds to the state illustrated in FIG. 1, where the input of the converter is directly connected to the output of the converter. In the other 6 active states (states 13, 14 and 19–22 from FIG. 3), one of the output voltages is equal to zero, while the other two are equal to one of the input voltages (with an appropriate polarity). Similarly, one of the input currents is zero while the other two are equal to some combination of the output currents.

Figure 4:
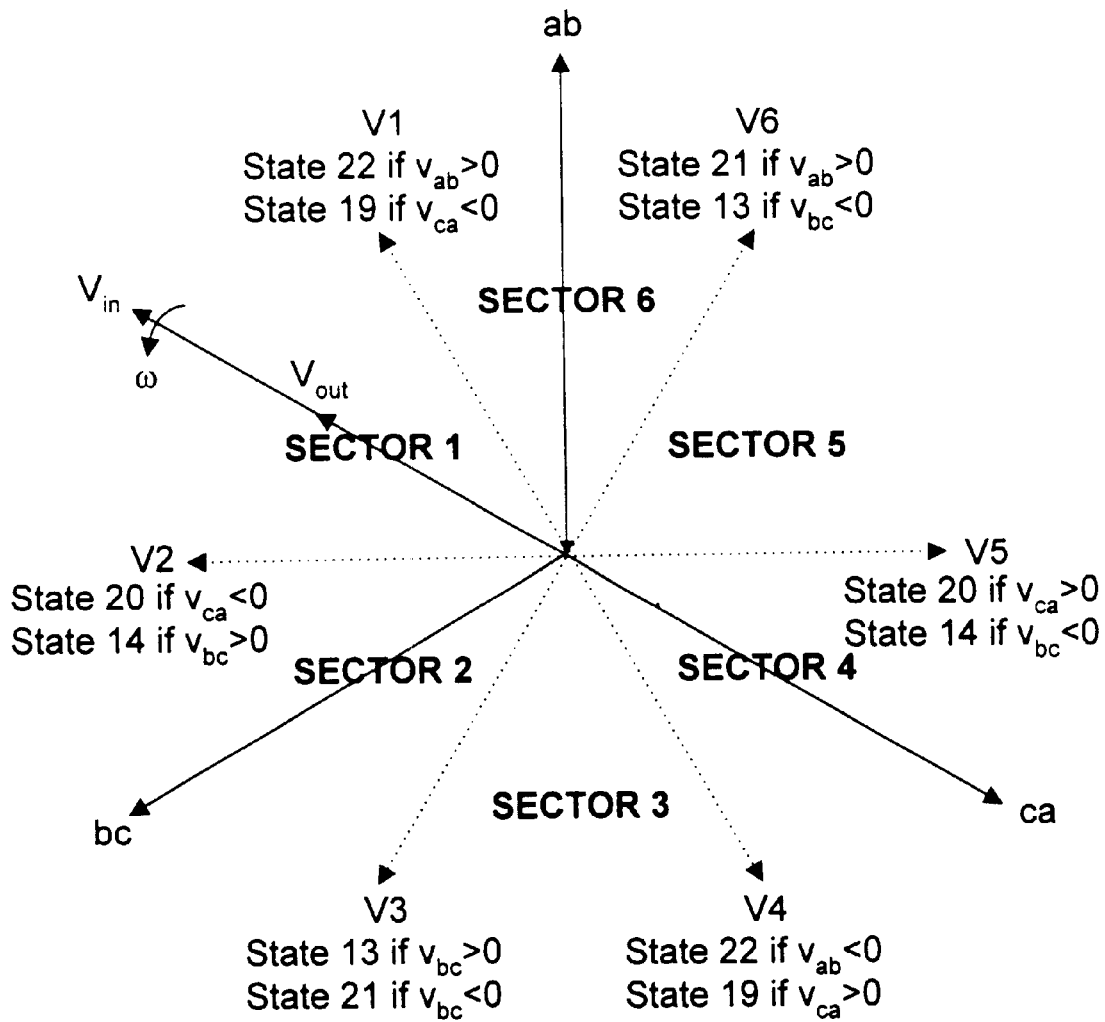
FIG. 4 is a graphical illustration of input voltage space vector, reference output voltage space vector and output voltage space vectors corresponding to the allowed active switching states as shown in FIG. 3.

FIG. 4 graphically illustrates input voltages $v_{ab}$, $v_{bc}$, and $v_{ca}$ (from voltage sources 112–116, respectively) as they form a balanced three-phase set of a constant frequency. Space vector $V_{in}$ is representative of all three phases of the converter input voltage, and may be visualized as rotating around its origin at speed ω, equal to the line frequency. The instantaneous values of input voltages $v_{ab}$, $v_{bc}$ and $v_{ca}$ are then obtained as projections of the space vector $V_{in}$ onto the directions of axes ab, bc, and ca. An analogous representation can be done for converter output voltages.

The six active converter switching states (states 13, 14, and 19–22 in FIG. 3) provide output voltages that can be represented with vectors in directions of vectors V1 through V6 in FIG. 4. For example, state 13 (from FIG. 3) is characterized by $v_{AB}=-v_{bc}$, $v_{BC}=v_{bc}$, and $v_{ca}=0$. If $v_{bc}$ is positive, the output voltage of the converter circuit 105 in state 13 can be represented with a space vector in the direction of V3, as shown in FIG. 4. If $v_{bc}$ is negative, the output voltage corresponding to state 13 can be represented with a space vector in the direction of V6. The exact length of these space vectors depends on the instantaneous value of $v_{bc}$. Similarly, the remaining five active switching states of the converter result in space vectors in the directions of V1, V2, V3, V4, V5 and V6. Each space vector V1 through V6 can be obtained with two different switching states. For example, space vector V1 can be obtained with states 19 and 22. Switching state 23 results in the converter output voltages being represented by the input space vector $V_{in}$. All zero states (for example states 1–12 and 15–18) result in the converter output voltages being equal to zero, therefore represented in FIG. 4 as a point in the origin.

The PWM AC voltage regulator of the present invention provides a predetermined magnitude of the output voltage, according to desired values for a given system. For example, a desired output voltage may be determined as the maximum voltage possible such that the inrush current is held below a threshold level. It is desirable, for example, to keep the inrush current of a motor below a given value, during motor startup. As will be evident from the explanation set forth in this disclosure, the magnitude of the voltage to the output can be kept at a single predicted value during a preselected time period, or can be selectively varied over that time period, to provide optimum operation and efficiency.

This desired output voltage at a given time is indicated in FIG. 4 by an output voltage reference space vector $V_{out}$. Due to the discrete nature of semiconductor switches, which results in a finite number of allowed switching states as summarized in FIG. 3, the converter circuit 105 cannot generate an output voltage equal to $V_{out}$ on an instantaneous basis. It can only synthesize an output voltage whose moving average value, with the averaging period being determined by the converter switching frequency, is equal to $V_{out}$. The output voltage can be synthesized in two ways.

One way is to make use of a zero switching state, for example, state 4, and active switching state 23. In this case, the output voltage space vector $V_{out}$ is synthesized from the input space vector $V_{in}$ (state 23) and the zero space vector (state 4). These two switching states follow each other in time at a frequency equal to the converter's switching frequency, generally much higher than the line frequency. The obtained output voltage waveform, for each phase, consists of a series of high-frequency pulses, having the respective phase's input voltage sinusoid as their envelope. The magnitude of the fundamental component of the output voltage depends on the ratio of the duration of the time intervals during which the converter is in switching states 23 and 4. Note that this control method does not allow for the possibility of improving the power factor at converter's input, since the fundamental component of the converter's output voltage is always in phase with the converter's input voltage. However, this method represents an improvement over prior art in that it does not depend on the load power factor, and in that it provides better harmonic contents of the output voltage and current waveform.

As an alternative and preferred way to synthesize the output voltage, the six active switching states (namely states 13–14 and 19–22) and appropriately selected zero states are periodically applied through space vector modulation (SVM). The position of the reference output voltage space vector $V_{out}$ will determine which particular active states (i.e. space vectors V1–V6) are used at a given time. Zero states will be selected with some performance goal (e.g. higher efficiency) in mind. The magnitude and the position of $V_{out}$ will determine the durations of application of each active and zero switching state. For example, as long as $V_{out}$ is in the area indicated as sector 1 in FIG. 4, the switching states 19 and 20 and an appropriate zero switching state will be used to synthesize the output voltage. These three switching states will follow each other in time at a frequency equal to the converter's switching frequency during the 60 degree time interval corresponding to $V_{out}$ being in sector 1. This can be thought of as if the reference output vector $V_{out}$ were synthesized from two vectors laying along the directions V1 and V2, respectively, and a zero vector. The output voltage waveform of any output phase will consist of a series of pulses having the top and bottom envelopes of the three-phase input voltage waveform as their top and bottom envelopes, respectively. The magnitude of the fundamental component of the output voltage is determined by the ratio of the duration of the time intervals during which the converter is in the two active switching states and in the zero state being used. As $V_{out}$ travels through sectors 1 through 6, the switching states used to synthesize the output voltage are summarized in FIG. 4.

The durations of application of each active and zero switching states are determined from the projections of the reference output space vector $V_{out}$ onto the two adjacent output space vectors (e.g. V1 and V2 for sector 1). For example, consider a system including a switching frequency $f_s$ and a switching period $T_s=1/f_s$. A desired magnitude and position of $V_{out}$ is known. A desired magnitude of $V_{out}$, for example, may be determined by processor 250, such that the input current remains below a particular threshold during a motor's accelleration. A desired position of $V_{out}$, for example, may be determined by the processor 250, such that some power factor correction is achieved. Processor 250 senses the input line voltage at each of the three lines. From this information, processor 250 determines the sector in which the input line voltage $V_{in}$ lies. Next, the processor 250 determines the position of the reference output voltage vector $V_{out}$ based on the position of $V_{in}$ and the desired phase displacement between the input and output voltages. This phase displacement, if present, allows achieving power factor correction. FIG. 4 illustrates the case where no power factor correction is desired. Therefore, $V_{out}$, with the desired magnitude, lies in the same direction as $V_{in}$. In FIG. 4, for example, $V_{out}$ lies between V1 and V2. Vector $V_{out}$ is projected onto V1, and processor 250 determines the particular ratio between the length of the projection of $V_{out}$ onto V1, and the length of V1 itself. Let this ratio be called $d_x$. Similarly, $V_{out}$ is projected onto V2, and processor 250 determines the ratio between the length of the projection of $V_{out}$ onto V2, and the length of V2 itself. Let this ratio be called $d_y$. In this example then, in each switching period $T_s$, the system would spend $d_x*T_s$ seconds in state 19 (corresponding to V1), $d_y*T_s$ seconds in state 20 (corresponding to V2), and $(1-dx-d_y)*T_s$ seconds in a zero state, determined as described below. The moving average value of the converter's output voltage will then be the desired magnitude.

Advantages of the SVM method over the first control method (namely, synthesizing the output voltage using switching state 23 and a zero state) include achieving a better harmonic content of the output voltage, achieving lower switching losses in the power semiconductors through the use of appropriate zero vectors, and the possibility of implementing power factor correntrion. Better harmonic content is due to the fact that SVM method uses all three input voltages (namely, $v_{ab}$, $v_{bc}$ and $v_{ca}$) in order to synthesize any one of the output voltages ($v_{AB}$, $v_{BC}$ or $v_{CA}$). This is different from the first control method (synthesizing the output voltage using switching state 23 and a zero state), which uses only $v_{ab}$ to synthesize $v_{AB}$, only $v_{bc}$ to synthesize $v_{BC}$ and only $v_{ca}$ to synthesize $v_{CA}$. Switching loss is typically minimized by changing states in as few switches as possible, because losses are associated with each change of state. In the first control method, only zero state 4 (switches 1, 2, and 3 are open and switches 4, 5, and 6 are closed, or 000111) and active state 23 (switches 1, 2, and 3 are closed and switches 4, 5, and 6 are open, or 111000) are used. Within every switching cycle, switching from zero state 4 to active state 23, and vice versa, each of the six switches must change state, thus maximizing the switching loss. In contrast, in the SVM method, by choosing the zero state (within each sector) in order to minimize the number of switches changing state, switching loss may be decreased.

For example, $V_{in}$ and $V_{out}$ are in sector 1, as shown in FIG. 4. In sector 1, active states 19 and 20 are used. From FIG. 3, the switch configuration for active state 19 is 101010 (switches 1, 3, and 5 are closed and switches 2, 4, and 6 are open). Similarly, the switch configuration for active state 20 is 101100. Because both active states 19 and 20 have switches 1 and 3 closed and switches 2 and 6 open, these switches do not change states when switching from active state 19 to active state 20, or vice versa. A zero state is then chosen to minimize the number of switches changing state. Ideally, in this example, the chosen zero state would have switches 1 and 3 closed and switches 2 and 6 open. There is, however, no such zero state in FIG. 3. It is possible to choose a zero state that permits three of the four switches at issue to remain in the same state, such as, for example, zero state 17 (100110). Therefore, the method and system of the present invention improve the efficiency of the circuit by minimizing switching loss by minimizing the number of switches changing state through the use of appropriate zero and active states.

Further, SVM makes it possible to synthesize an output voltage whose fundamental harmonic is shifted with respect to the input voltage by simply introducing an appropriate phase displacement between $V_{in}$ and $V_{out}$ in FIG. 4. This can be used to improve the power factor seen from the line terminals. The power factor (PF) may be represented by the cosine of the phase displacement between the fundamental harmonics of a voltage and the respective current. Generally, induction motors have a lagging PF in the 0.6–0.9 range, depending on the size of the motor. By maximizing the PF, the amount of current needed to attain a certain amount of power is minimized.

In a system that does not utilize a converter circuit, an induction motor will require a current from the power line whose fundamental component lags behind the fundamental component of the voltage by an angle x, where PF=cos (x). Conversely, by using a converter circuit, which is capable of producing an output voltage that leads the power-line voltage by amount x, the motor current will then lag the converter output voltage (which is, at the same time, the motor input voltage) by x. The motor current will be in phase with the power line voltage, however, because the converter output voltage leads the power line voltage by x. The converter circuit will operate with a unity input PF or PF=1, because the fundamental component of the converter input current will be generally in phase with the fundamental component of the motor current, thus maximizing the PF and minimizing the amount of current required from the power line.

The operation of an exemplary system, in accordance with the present invention, is as follows. The system (as shown, for example, in FIG. 2) receives, as input, a given three-phase input, such as 460 volts at 60 Hz. The switching frequency of the converter is $f_s=1$ kHz with a switching period of $T_s=1$ mSec. The output of the system is a three-phase induction motor, used in the HVAC industry. The desired voltage output of the converter may be such that the current drawn by the load remains less than a given threshold value. Thus, while the motor is starting, the desired voltage output may be low; after the motor is running, the desired voltage may be higher. For this example, consider a desired voltage output of 345 volts.

Figure 5:
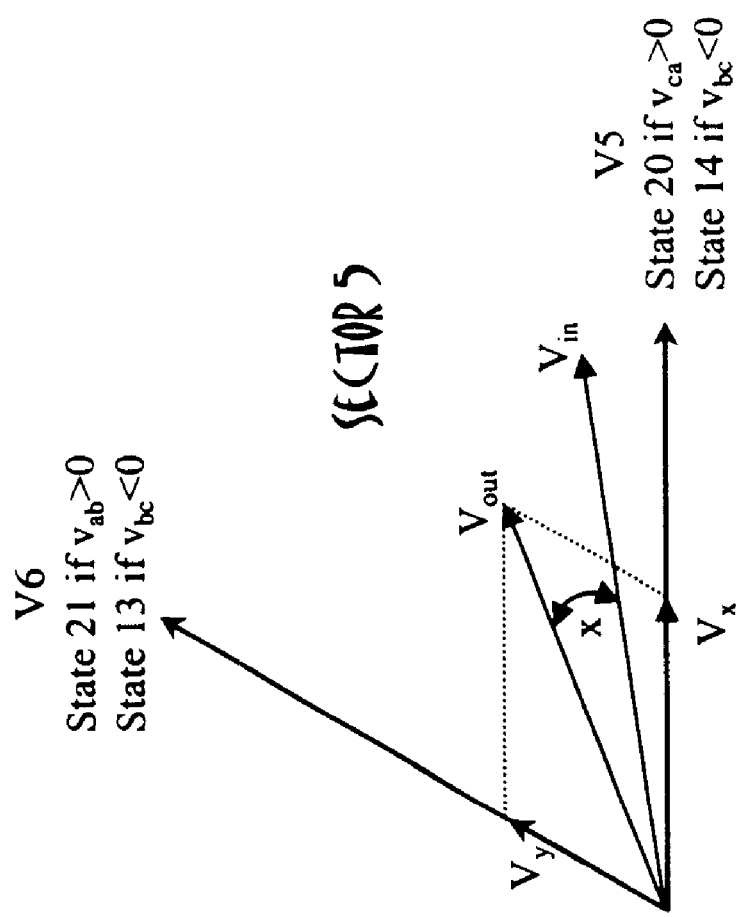
FIG. 5 is a further detailed graphical illustration of input, reference output and output voltage space vectors in one particular case.

In order to obtain the desired voltage output of the converter, the system senses the three phases of the input voltage and determines the space vector $V_{in}$, representing all three phases of the converter input voltage. The processor then determines in which sector $V_{in}$ is positioned (for example, as shown in FIG. 5). Assume $V_{in}$ is positioned in sector 5. If power factor correction is desired, the processor determines the position of the reference output space vector $V_{out}$ by adding the power factor correction angle x to the position of $V_{in}$. Thus, the desired output voltage space vector, $V_{out}$, is shown shifted by an angle x with respect to $V_{in}$ in FIG. 5. The length of $V_{out}$ is only ¾ of the length of $V_{in}$ (345/460 volts). The processor will then determine the active switching states based on the position of $V_{out}$. For example, if in this example, the processor would select active switching states 13 and 14. The processor would then select zero switching states that minimize the number of switching transitions within a switching period.

Next, the processor would project $V_{out}$ onto the two nearest (adjacent) output space vectors, in this case V5 and V6. In FIG. 5, these projections are called $V_x$ and $V_y$, respectively. The processor would determine the ratios $d_x=V_x/V5$ and $d_y=V_y/V6$. For example, the processor may determine that the ratio $d_x$ is 0.5 and the ratio $d_y$ is 0.3. The processor would then calculate that the system would spend 0.5 times the switching period, or 0.5 mSec, in state 14 (associated with V5) and 0.3 times the switching period, or 0.3 mSec, in state 13 (associated with V6). Because the full switching period is 1 mSec, the remaining time (or 1 mSec–0.3 mSec–0.5 mSec) is 0.2 mSec, which will be spent in an appropriate zero state, determined as described above. As $V_{out}$ shifts within a sector or to another sector, this data is re-determined.

It will be apparent to those skilled in the art that various modifications and variations can be made in the device of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a three-phase pulse-width-modulated alternating current voltage regulator to obtain an output voltage of a desired magnitude and phase in a system including a set of four-quadrant switches, said method comprising the steps of:

defining a set of active switching states and a set of zero switching states based on configurations of the set of four-quadrant switches;

associating each active switching state with two of six space vectors, wherein the six space vectors delineate the voltage plane into six sectors;

identifying one of the six sectors based on a position of the desired output voltage space vector;

identifying two active switching states from the set of active switching states associated with the identified sector;

identifying an appropriate zero switching state from the provided zero switching states based on the identified active switching states; and alternating between the two identified active switching states and the identified appropriate zero switching state to obtain the desired output voltage.

2. The method of claim 1, wherein the set of four-quadrant switches includes six four-quadrant switches.

3. The method of claim 1, wherein the step of identifying an appropriate zero vector includes identifying a zero switching state that requires a minimal number of switches to change state when switching between the two identified active switching states and the zero switching state.

4. The method of claim 1, wherein the alternating step includes alternating between the two identified active switching states and the identified appropriate zero switching state at a frequency greater than the line frequency.

5. A pulse-width-modulated alternating-current voltage regulator system comprising:

a three-phase voltage source, having a first, second, and third terminals;

a converter circuit, connected at a first end to the first, second, and third terminals of the three-phase voltage source;

a three-phase load having a first, second, and third terminals, wherein a second end of the converter circuit is connected to the first, second, and third terminals of the three-phase load; and a processor for controlling the converter circuit, including instructions for implementing a space vector modulation method.

6. The system of claim 5, wherein the converter circuit comprises:

a first four-quadrant switch, having a first and second ends, wherein the first end of the first switch is connected to the first terminal of the three-phase voltage source;

a second four-quadrant switch, having a first and second ends, wherein the first end of the second switch is connected to the second terminal of the three-phase voltage source;

a third four-quadrant switch, having a first and second ends, wherein the first end of the third switch is connected to the third terminal of the three-phase voltage source;

a fourth four-quadrant switch, having a first and second ends, wherein the first end of the fourth switch is connected to the second end of the first switch and the second end of the fourth switch is connected to the second end of the second switch;

a fifth four-quadrant switch, having a first and second ends, wherein the first end of the fifth switch is connected to the second ends of the fourth and second switch and the second end of the fifth switch is connected to the second end of the third switch; and a sixth four-quadrant switch, having a first and second ends, wherein the first end of the sixth switch is connected to the second ends of the fifth and third switch and the second end of the sixth switch is connected to the second end of the first switch and the first end of the fourth switch;

wherein the first terminal of the three-phase load is connected to the second ends of the first and sixth switches and the first end of the fourth switch, the second terminal of the three-phase load is connected to the second ends of the second and fourth switches and the first end of the fifth switch, and the third terminal of the three-phase load is connected to the second ends of the third and fifth switches and the first end of the sixth switch.

7. The system of claim 5, wherein the three-phase load is a three-phase induction motor.

8. The system of claim 5, wherein the first through sixth four-quadrant switches each include two two-quadrant switches.

9. The system of claim 8, wherein the two-quadrant switches include insulated gate bipolar transistors (IGBTs).

10. The system of claim 5, wherein the processor is connected to the first, second, and third terminals of the three-phase voltage source.

11. The method of claim 1 further comprising the step of determining an input voltage space vector.

12. The method of claim 11 wherein the step of determining an input voltage space vector includes sensing an input voltage for each phase of a three-phase voltage source.

13. The method of claim 11 further comprising the step of positioning the input voltage space vector in one sector of the six sectors of the voltage plane.

14. The method of claim 13 further comprising the steps of:

applying a power factor correction to the input voltage space vector; and determining the position the output voltage space vector based on a position of the input voltage space vector.

15. The system of claim 5 further comprising a plurality of sensors connected between the three-phase voltage source and the converter circuit, the plurality of sensors sensing a voltage of each phase of the three-phase voltage source.

16. The system of claim 15 wherein:

the plurality of sensors are operatively connected to the processor to transmit signals corresponding to the voltage of each phase of the three-phase voltage source; and the processor being configured to receive the signals from the plurality of sensors and to control the converter circuit with the space vector modulation method in response to the signals from the plurality of sensors.

17. The system of claim 5 wherein:

the three-phase load comprises a three-phase induction motor used in an air conditioning or refrigeration application; and the converter circuit being configured to provide undistorted output current and voltage waveforms in response to the space vector modulation method implemented by the processor, whereby the converter circuit is used for starting the three-phase induction motor.

18. The system of claim 5 further comprising a table listing a set of active states and a set of zero states for the converter circuit, wherein each state corresponds to a configuration of the converter circuit.

19. The system of claim 18 wherein each active state of the set of active states is associated with two space vectors of six predefined space vectors, the six predefined space vectors delineate a voltage plane into six sectors.

20. The system of claim 19 wherein the processor comprises:

means for determining one sector of the six sectors of the voltage plane corresponding to a desired output voltage space vector; and means for determining two active states from the set of active states corresponding to the determined one sector.

21. The system of claim 20 wherein the processor comprises means for determining a zero state in response to the two actives states determined by the means for determining two active states.

22. The system of claim 21 wherein the processor comprises means for sending signals to the converter circuit to switch the configuration of the converter circuit between the two actives states determined by the means for determining two active states and the zero state determined by the means for determining a zero state.

23. The system of claim 22 wherein the means for sending signals to the converter circuit switches the converter circuit at a frequency greater than a line frequency of the three-phase voltage source.

24. The system of claim 5 wherein the processor comprises means for achieving a power factor correction.

* * * * *